United States Patent
Emond (10) Patent No.: US 8,265,650 B2
(45) Date of Patent: Sep. 11, 2012

(54) GPS DATA MANAGEMENT MODULE FOR USE IN LOCATION-BASED SERVICE SYSTEMS

(75) Inventor: Germain Emond, Boucherville (CA)

(73) Assignee: Radio IP Software Inc., Montreal (CA)

( * ) Notice: Subject to any disclaimer, the term of this patent is extended or adjusted under 35 U.S.C. 154(b) by 87 days.

(21) Appl. No.: 11/514,223

(22) Filed: Sep. 1, 2006

(65) Prior Publication Data

US 2007/0049292 A1    Mar. 1, 2007

Related U.S. Application Data

(60) Provisional application No. 60/712,830, filed on Sep. 1, 2005.

(51) Int. Cl.
*H04W 24/00* (2009.01)

(52) U.S. Cl. .................................................. 455/456.1

(58) Field of Classification Search ............... 455/456.1; 342/357.2
See application file for complete search history.

(56) References Cited

U.S. PATENT DOCUMENTS

| | | | |
|---|---|---|---|
| 5,365,450 A | 11/1994 | Schuchman et al. | |
| 5,661,652 A | 8/1997 | Sprague et al. | |
| 5,706,014 A | 1/1998 | Abbasi | |
| 5,726,893 A | 3/1998 | Schuchman et al. | |
| 6,028,550 A | 2/2000 | Froeberg et al. | |
| 6,324,564 B1 * | 11/2001 | Thielke et al. | 709/202 |
| 6,363,320 B1 | 3/2002 | Chou | |
| 6,429,808 B1 * | 8/2002 | King et al. | 342/357.02 |
| 6,519,466 B2 * | 2/2003 | Pande et al. | 455/456.1 |
| 6,564,146 B1 | 5/2003 | Meyer et al. | |
| 6,603,977 B1 * | 8/2003 | Walsh et al. | 455/456.1 |
| 6,611,536 B1 | 8/2003 | Ahmed | |
| 6,647,257 B2 * | 11/2003 | Owensby | 455/414.1 |
| 6,704,652 B2 | 3/2004 | Yi | |
| 6,731,940 B1 * | 5/2004 | Nagendran | 455/456.1 |
| 6,738,630 B2 * | 5/2004 | Ashmore | 455/456.3 |
| 6,754,583 B2 | 6/2004 | Verbil | |
| 6,819,919 B1 * | 11/2004 | Tanaka | 455/414.1 |
| 6,983,156 B2 | 1/2006 | Fukushima et al. | |
| 7,028,094 B2 * | 4/2006 | Le et al. | 709/230 |
| 2002/0175855 A1 * | 11/2002 | Richton et al. | 342/357.02 |
| 2003/0011511 A1 * | 1/2003 | King et al. | 342/357.02 |
| 2003/0097217 A1 | 5/2003 | Wells et al. | |
| 2004/0008138 A1 * | 1/2004 | Hockley et al. | 342/357.09 |
| 2004/0008660 A1 * | 1/2004 | Lee | 370/349 |
| 2004/0057408 A1 * | 3/2004 | Gray | 370/338 |
| 2004/0087277 A1 * | 5/2004 | Edge et al. | 455/67.16 |
| 2004/0090950 A1 | 5/2004 | Lauber et al. | |
| 2004/0138807 A1 * | 7/2004 | Jha et al. | 701/200 |
| 2004/0164867 A1 * | 8/2004 | Jormalainen | 340/573.4 |
| 2004/0203855 A1 * | 10/2004 | Veerasamy et al. | 455/456.1 |

(Continued)

*Primary Examiner* — Rafael Pérez-Gutiérrez
*Assistant Examiner* — German Viana Di Prisco
(74) *Attorney, Agent, or Firm* — Goudreau Gage Dubuc; Hugh Mansfield (57) ABSTRACT

A system and method are presented to provide radio and GPS coverage versatility in a location-based service (LBS) system, such as an automatic vehicle location (AVL) system. A mobile client in communication with one or more servers of an LBS system includes one or more mobile communication devices and one or more GPS devices for establishing a position of the client. The client is configured to determine whether none of the one or more GPS devices provide the server access to the position through a wireless protocol implemented therewith, or whether the position should be communicated to the server using the one or more communication devices.

16 Claims, 7 Drawing Sheets

U.S. PATENT DOCUMENTS

| | | | |
|---|---|---|---|
| 2004/0229560 A1* | 11/2004 | Maloney | 455/3.01 |
| 2005/0068169 A1* | 3/2005 | Copley et al. | 340/539.13 |
| 2005/0085239 A1* | 4/2005 | Cedervall | 455/456.1 |
| 2005/0184904 A1* | 8/2005 | Humphries et al. | 342/357.07 |
| 2005/0192024 A1* | 9/2005 | Sheynblat | 455/456.1 |
| 2005/0197137 A1* | 9/2005 | Radic et al. | 455/456.1 |
| 2005/0212700 A1* | 9/2005 | Diggelen et al. | 342/357.06 |
| 2005/0225483 A1* | 10/2005 | Abraham et al. | 342/357.15 |
| 2005/0227709 A1* | 10/2005 | Chang et al. | 455/456.1 |
| 2005/0228589 A1* | 10/2005 | Diggelen et al. | 702/1 |
| 2005/0234643 A1* | 10/2005 | Abraham et al. | 701/213 |
| 2005/0272473 A1* | 12/2005 | Sheena et al. | 455/563 |
| 2005/0286421 A1* | 12/2005 | Janacek | 370/231 |
| 2008/0102858 A1* | 5/2008 | Giniger et al. | 455/456.3 |
| 2008/0113672 A1* | 5/2008 | Karr et al. | 455/456.1 |
| 2011/0136500 A1* | 6/2011 | Sung et al. | 455/456.1 |

* cited by examiner

GPS DATA MANAGEMENT MODULE FOR USE IN LOCATION-BASED SERVICE SYSTEMS

CROSS REFERENCE TO RELATED APPLICATIONS

This application claims priority on U.S. Provisional Patent Application No. 60/712,830 filed on Sep. 1, 2005. The entire content of which is herein incorporated by reference.

FIELD OF THE INVENTION

The disclosure relates to a Global Positioning System (GPS) data management module that is used in managing GPS data and, in particular, to a GPS data management module for use in location-based service (LBS) systems.

BACKGROUND OF THE INVENTION

The advancement of wireless communication technologies and networking systems has provided users of such technologies a variety of communication services. Namely, wireless communication services provide, amongst others, voice, email, internet, messaging and data communications between various wireless, network and wireline devices connected directly or indirectly to any one or more of numerous existing wireless networks in operation around the globe.

One type of wireless service gaining popularity due to its wide applications and increasing availability is Location-Based Services (LBS). The LBS can be used in various applications and conditions, such as emergency assistance, criminal tracking, GIS (Geographical Information System), traffic information, vehicle navigation and tracking, as well as various location-dependent advertising and marketing systems and methods. In each case, the LBS uses the mobile user's position to provide the service in question. This position can be determined and calculated using various methods and systems including network-based positioning methods such as Cell-ID, E-OTD (Enhance Observed Time Difference), AFLT (Advanced Forward Link Trilateration), EFLT (Enhanced Forward Link Trilateration), TDOA (Time Difference of Arrival), and AOA (Angle of Arrival), external methods including GPS (Global Positioning System) and A-GPS (Assisted GPS), and hybrid methods combining at least two of the above.

Network-based methods generally use the signals communicated between a mobile device and one or more network tower communicating therewith to calculate the position of the mobile device. Generally, the position is computed by the network and the position accuracy is dependent on the network coverage in the area. In other words, a user of a LBS implemented using a network-based positioning method will be better served in an area densely covered by the network supporting the user device and LBS, rather than in an area sparsely covered by the supporting network.

GPS on the other hand operates independently of the radio and cellular communication networks. The GPS is a worldwide navigation and positioning system which determines the location of an object on earth by using a constellation of twenty-four (24) GPS satellites in orbits at an elevation of approximately 20 000 Km above Earth. The satellites broadcast specially coded signals that can be processed in a GPS receiver. Generally, signals from at least four (4) satellites are needed to compute the receiver's position in 3D, namely computing the receiver latitude, longitude, altitude and synchronization to GPS time.

Generally, the position of the GPS receiver is triangulated by calculating the propagation time of signals between the satellites and the receiver. The coded signals transmitted by the satellites are replicated in the GPS receiver. If the satellite and receiver clocks are properly synchronized, the replica code may be shifted in time until satellite and replica code synchronization is optimized. The time shift required for code synchronization thus provides the propagation time, and ultimately the distance between the receiver and the satellite. The calculated propagation times and attributed distances, otherwise termed pseudoranges due to the lack of perfect synchronicity between the satellites and the receiver, can be used to calculate the position of the receiver, generally within 10 meters, and the user clock offset, generally within 0.1 µs.

Since GPS relies on the reception of satellite signals, a GPS receiver relies upon having a reasonably clear view of the sky. Consequently, a GPS-based LBS will be far less efficient indoors, or even in a dense urban setting where signal interference and multiple reflections may drastically reduce the efficiency and accuracy of GPS measurements. Furthermore, since a stand-alone GPS receiver does not generally provide a communication link with any public or proprietary wireless communication network, the GPS receiver will be coupled with an appropriate mobile communication device (MCD) to communicate its position to an LBS platform and application server through a supported wireless network.

Figure 1:
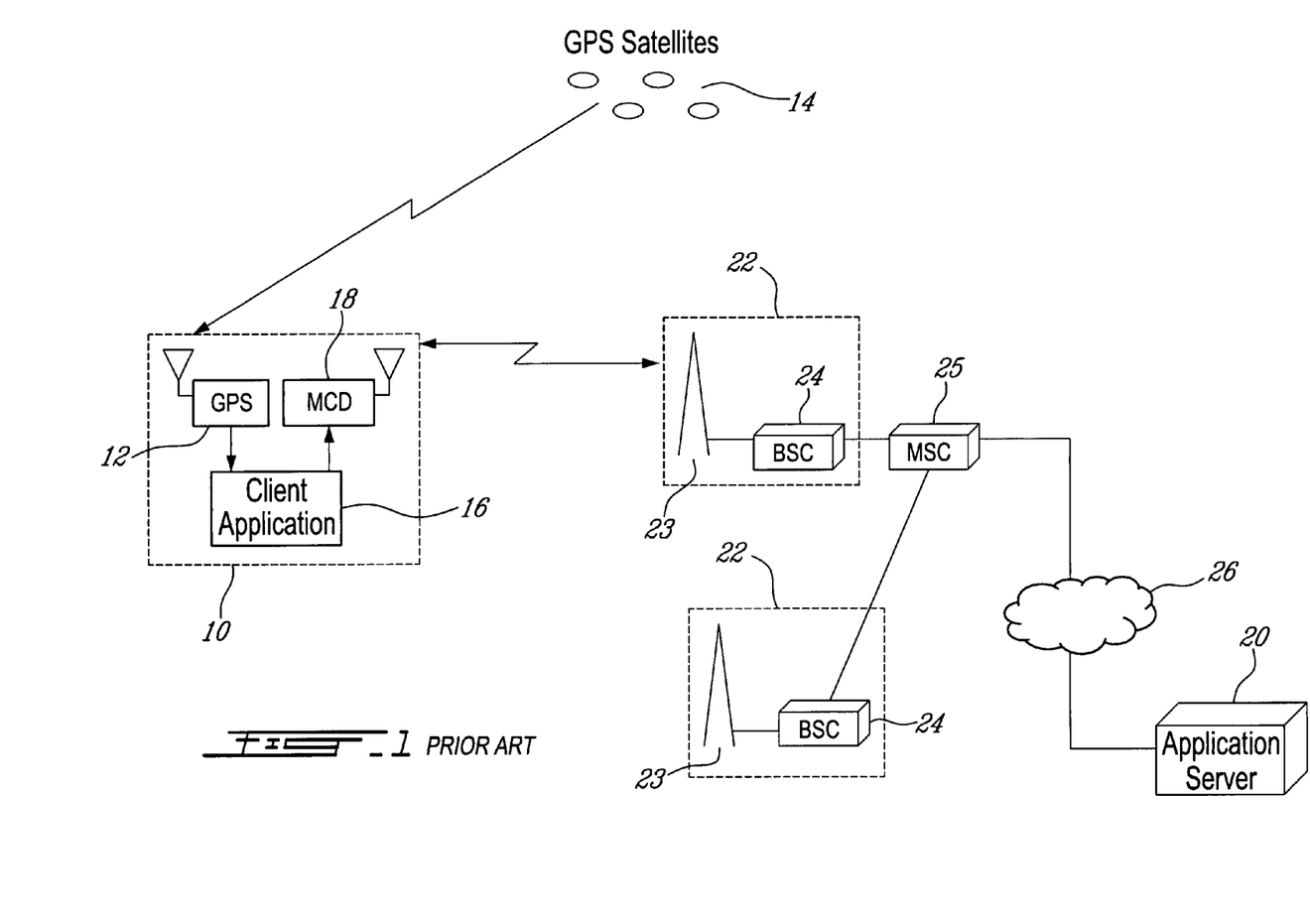
FIG. 1 shows, in diagrammatic form, a prior art LBS system using GPS.

A conceptual prior art GPS-based LBS system is illustrated in FIG. 1. A client 10, acquires GPS positioning data using a GPS receiver 12 in communication with, in general, at least four (4) GPS satellites 14. The calculated positions are passed through the client application 16, and transmitted, using an appropriate MCD 18 in communication with a wireless communication network, to an application server 20. The wireless communication network may comprise such networks as, for example, a GSM/GPRS wireless communication network, a CDMA wireless communication network, a TDMA wireless communication network, a WCDMA wireless communication network, etc. In general, the wireless communication network will comprise plural base stations 22, each comprising at least one base transceiver station (BTS) 23 and a base station controller (BSC) 24 for direct communication with the MCD 18, and a mobile switching center 25 directing the communicated data to the application server through a core network 26. The application server 20 can then extract the data from the network 26. Communication from the application server 20 to the client 10 is also possible in the reverse order.

In order to improve GPS coverage, an LBS may opt to implement an A-GPS solution. The A-GPS technology concept combines GPS data acquired by a mobile GPS receiver and a fixed GPS receiver. In essence, the A-GPS concept is similar to DGPS (Differential GPS) wherein GPS data gathered by the fixed receiver is used to improve GPS positioning of the mobile unit. Yet, unlike DGPS, which is usually implemented to improve mobile positioning accuracy, A-GPS is generally used to improve the coverage of the mobile GPS receiver, and thus provide a better service.

Figure 2:
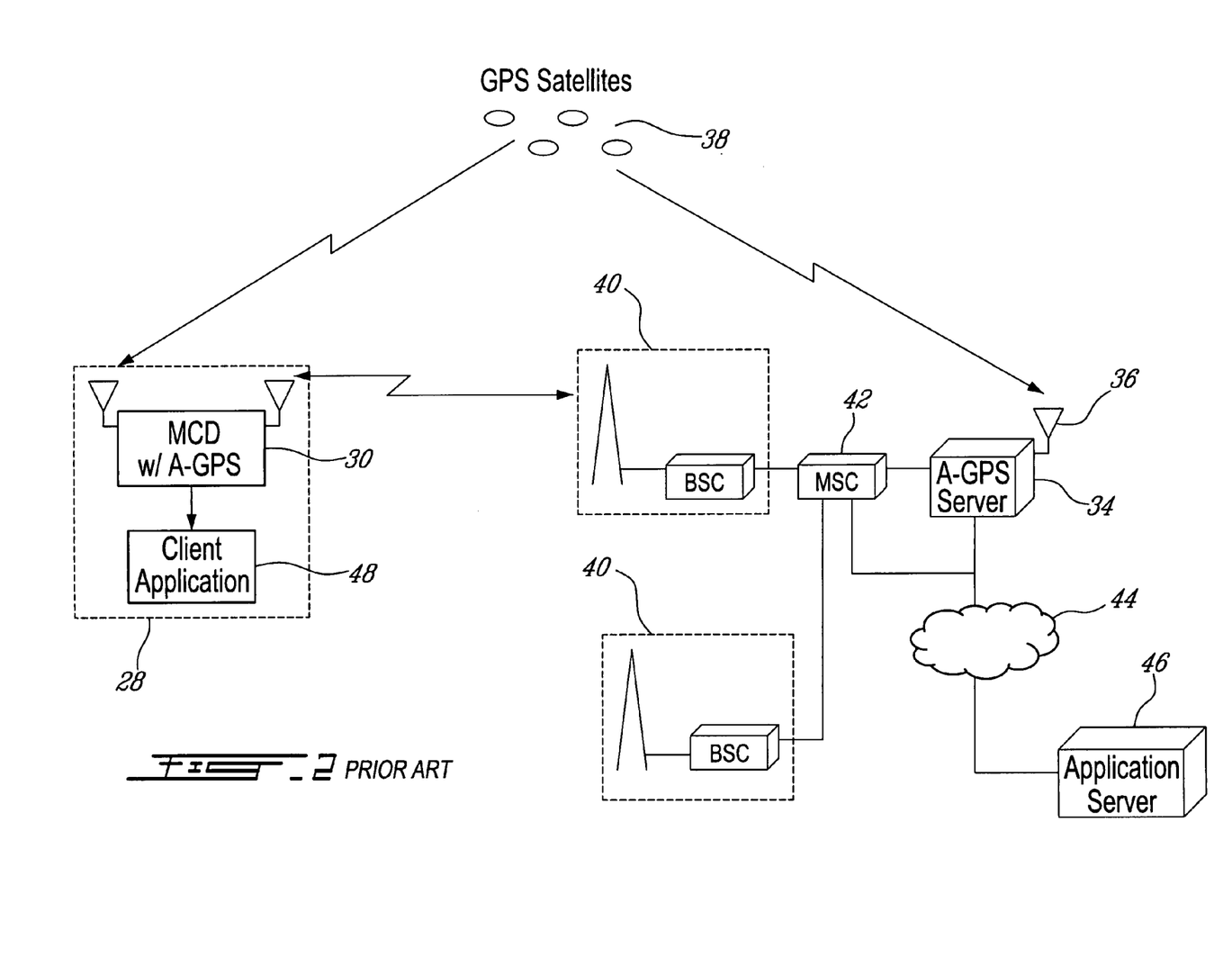
FIG. 2 shows, in diagrammatic form, a prior art LBS system using A-GPS.

A conceptual prior art A-GPS network, as illustrated in FIG. 2, includes a client 28 comprising an A-GPS receiver 30 that also acts as a MCD, an A-GPS server 34 with a reference GPS receiver 36 that can simultaneously "see" the same satellites 38 as the client 28, and a wireless network infrastructure comprising plural base stations 40 and a MSC 42. The A-GPS server 34 can obtain from the MSC 42 the client's position (up to the level of the cell and sector), and at the same time monitor the signals from the GPS satellites 38 seen by the client 28. Consequently, the A-GPS server 34 can predict to a certain accuracy the GPS signals received by the client 28 for any given time, and assist the A-GPS receiver 30 in GPS signal acquisition by providing various position-dependent acquisition parameters, such as the Doppler shift of the GPS signals, to the client 28. Consequently, a client 28 comprising an A-GPS receiver 30 can detect and demodulate weaker signals than conventional GPS receivers as part of the acquisition and processing workload is taken by the reference receiver 36.

An A-GPS receiver, as in 30, can thus provide greater coverage to a mobile user than a single GPS receiver, working even indoors and in dense urban areas. Furthermore, as a connection is maintained between the A-GPS receiver 30 and the A-GPS server 34, GPS data may be transmitted to the A-GPS server 34 for processing, thereby further reducing the processing load on the client 28. Alternatively, the client may be equipped with a full A-GPS receiver 30 for full GPS processing. The computed positions can then be transferred to the A-GPS server 34 over the wireless link already established therewith for communication of acquisition parameters therefrom. In either case, the positioning data is accessible to the application server 46 through the core network 44.

In general, an A-GPS can be implemented in a variety of wireless communication networks. For example, the European GSM (Global System for Mobile Communications) standards GSM 03.71, 08.71 and 09.31, the North American GSM standard GSM 04.35, the CDMA standards IS-801-1 and IS-801-A, the TDMA standard TIA/EIA-136, as well a other relevant standards documents discuss provisions for such systems. Newer and evolving networks such as UMTS and WCDMA, leading the way to 3G (third generation) networks, can also provide A-GPS services. Other networks, possibly operating in other communication bands, may also implement their own A-GPS system and provide A-GPS coverage to their respective clients.

As stated hereinabove an LBS can be used in various applications and conditions. For example, an LBS may be used for vehicle tracking and navigation, namely in the context of emergency assistance and emergency response vehicles. An LBS of this type is often referred to as an automatic vehicle location (AVL) system, wherein tracking and navigation information is provided by a server application to plural clients mounted or carried within the vehicles in the system.

The prior art AVL client consists of an AVL application, a GPS or an A-GPS receiver and a wireless communication transceiver in communication with the server application or AVL server. The AVL server, which gathers client position information, uses these positions to track and provide navigation instructions to the clients as part of a dispatch center. The user, which receives instructions from the dispatch center, may also visualize navigation information, such as client positions, destinations, and other related positional information on a client display, or simply follow voice or text instructions transmitted thereto.

With reference now to FIG. 2, if the client 28 of an AVL system user is equipped with an A-GPS receiver 30, the position of the client 28 will be determined through the A-GPS network and automatically made available to both the client 28 and an application server 46 in communication with the A-GPS server 34. In general, GPS position determination is inherent in the communication protocols of an A-GPS network. In other words, neither the AVL client application 48 nor the AVL application server 46 need send the positioning data through the network as the client position is implicitly made available to both parties by the A-GPS network communication protocols. As discussed hereinabove, the mobile positions are calculated using both data from the mobile device 28 and data from the A-GPS server 34. Consequently, positions are generally automatically provided to both the mobile device 28 and the A-GPS server 34 through the network's own communication protocols. The AVL application server 46, without communicating directly with the clients, can access the client positions from the A-GPS server 34.

With reference now to FIG. 1, if the client 10 of an AVL system user is otherwise only equipped with a GPS receiver 12, the AVL client application 16 will gather positioning data from the GPS receiver 12 and transmit the data to the AVL application server 20 through an appropriate communication link. In this scenario, data is not provided to the application server 20 directly by the wireless network as positioning determination is not implicit to the network's communication protocol, as it is for the A-GPS system illustrated in FIG. 2.

One particular limitation of prior art AVL systems, and generally of LBS systems, is the lack of consistent positioning coverage as a user commutes from one coverage area to another. For instance, a user equipped with a GSM based A-GPS mobile device may not get full coverage in a CDMA rich area. Alternatively, the same user may travel to an area where a GSM network is operative, but where an A-GPS service is not provided. Furthermore, as network structures and technologies evolve, a user equipped with state-of-the-art instrumentation may not get satisfactory coverage in areas still served by legacy networks, and vice versa. For example, some digital MCDs were not developed to operate within analogue networks, or again, are not compatible with competing digital networks. Consequently, though the above user may be well equipped in one area, the equipment may lose positioning accuracy and efficiency in another area, or lose coverage entirely. For this reason, users of a LBS, or for example an AVL system, wherein consistent knowledge of positioning information is of great importance, and wherein the loss thereof could have serious consequences, may be forced to carry plural MCDs supported by various networks to ensure consistent coverage.

For example, AVL systems used in emergency vehicle dispatch centers and other such AVL systems for vehicle tracking and navigation may benefit from plural radio and GPS coverage. Alternatively, an LBS for criminal tracking may also require a reliable and consistent tracking mechanism; however, prior art LBS systems are not configured to address plural GPS and communication resources. In general, prior art LBS systems are constructed to operate using a single GPS input for each LBS client. Consequently, prior art LBS clients may get confused in the presence of plural GPS sources, particularly in the presence of both GPS and A-GPS sources where data may or may not need to be sent by the client application to the application server.

Consequently, a GPS data management module for a LBS system, for example an AVL system, is needed to provide increased radio and GPS coverage options and versatility to the LBS. Example embodiments of the invention, described herein and with reference to the appended illustrative drawings, provide a GPS data management module that helps overcome drawbacks of prior art LBS systems.

SUMMARY OF THE INVENTION

More specifically, in order to address the above and other drawbacks and in accordance with an example embodiment of the invention, there is provided a location based service system, the system including at least one mobile client, the client including at least one mobile communication device and at least one GPS device for establishing a position of the client and, at least one server in communication with the client for monitoring the position, the client determining if none of the at least one GPS device provides the server access to the position through a wireless communication protocol implemented therewith, and if none of the at least one GPS device provides the server access to the position, the client communicating the position to the server using the mobile communication device.

In accordance with another example embodiment of the invention, there is provided a method for providing a position of a client to a location based service server, the client including at least one mobile communication device and at least one GPS device, the method including the steps of:

A) establishing the client position using the GPS device;

B) determining if the at least one GPS device provides the server access to the position inherently through a wireless communication protocol implemented therewith; and C) if the at least one GPS device does not inherently provides the server access to the position, communicating the position to the server using said mobile communication device.

In accordance with yet another example embodiment of the invention, there is provided a client for a wireless system, the system including at least one server adapted for communications over a network and for providing a location based service to the client, the client comprising at least one GPS receiver for establishing a position of the client, and at least one transmitter in communication with the network. The client determines if the server has access to the position through the network, and if the server does not have access to the position, the client communicates the position to the server through the network using the transmitter.

In accordance with yet another example embodiment of the invention, there is provided a computer program product embodied on at least one computer-readable medium within a mobile client. The client is in communication through at least one wireless network with a Location-Based Service (LBS) system. The client includes at least one transmitter and at least one GPS receiver for establishing a position of the client. The computer program product includes computer code for obtaining the position of the client from the GPS receiver. The computer program product also includes computer code for determining whether the position is automatically accessible to the service system through the network. The computer program product also includes computer code for causing the position to be communicated to the service system using the transmitter when the position is not automatically accessible to the service system.

BRIEF DESCRIPTION OF THE DRAWINGS

Reference will now be made, by way of example, to the accompanying drawings.

DETAILED DESCRIPTION OF EXAMPLE EMBODIMENTS

Figure 3:
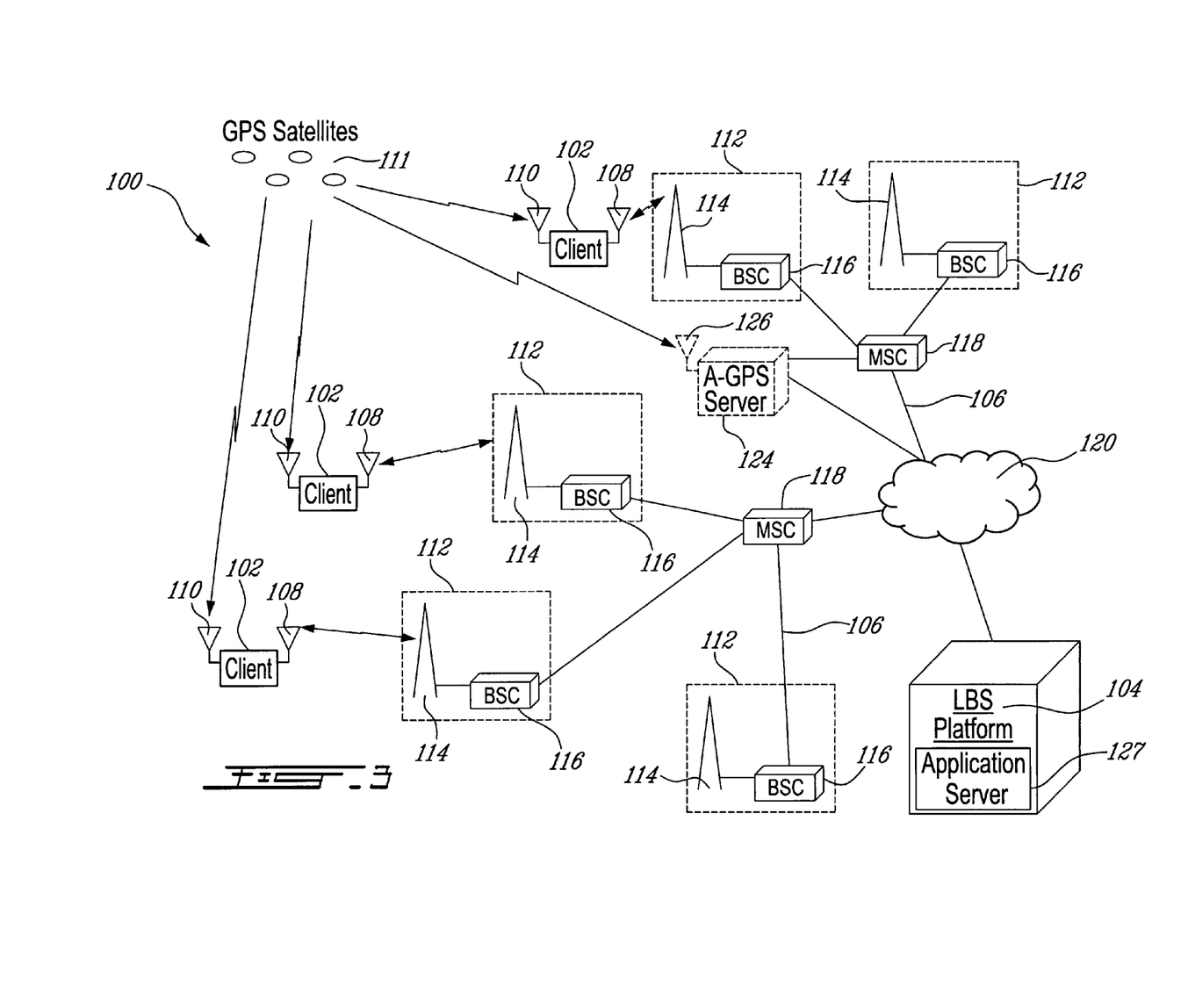
FIG. 3 shows, in diagrammatic form, an LBS system in accordance with an example embodiment of the invention.

Referring to FIG. 3, a location-based service (LBS) system, generally referred to using the reference numeral 100 and in accordance with an example embodiment of the invention, will now be presented. As will be further discussed hereinbelow, the LBS system 100, as described herein, may comprise any suitable LBS system using GPS positioning solutions. Namely, the system 100 provides users the option to combine plural radio and GPS sources within a single client for increased radio and GPS coverage. In an automatic vehicle location (AVL) system, for example, this feature reduces the likelihood that the service provider will lose contact with and/or lose track of its clients at any time.

Still referring to FIG. 3, the LBS system 100 generally comprises at least one mobile client as in 102 in communication with an LBS platform 104 using at least one wireless communication network as in 106. Each client 102 is generally equipped with at least one mobile communication device (MCD) having a radio transceiver 108 for communicating with at least one of the wireless communication networks 106. Each client is also generally equipped with at least one GPS receiver 110, which may be external or internal to the MCD, to receive GPS data from the GPS satellites in view 111 and to calculate the client's position. The position may be calculated independently and/or as part of, for example, an A-GPS solution.

The networks 106 each generally comprise a plurality of base stations 112, each comprising at least one base transceiver station (BTS) 114 and a base station controller (BSC) 116. The networks 106 may further comprise a mobile switching center (MSC) 118 directing communications between the BTS and the LBS platform 104. Such communications may be supported by a core network 120, which may include any type of public or private wireless and/or wireline network suitable for such communications. If the network 106 provides an A-GPS service, the network 106 will also comprise at least one A-GPS server 124 comprised of a reference GPS receiver 126 to assist clients communicating therewith in GPS positioning calculations.

The LBS platform 104 comprehensively refers to, and includes, an application server 127 that provides the location based services to the mobile clients 102. As will be discussed further hereinbelow with reference to FIG. 7, the LBS platform 104 and the application server 127 thereof, provide any of various types of LBS, whether it be an AVL service for vehicle dispatch, tracking and navigation, a criminal tracking service, or some other service using GPS client positioning as part of the service.

As will be apparent to a person of ordinary skill in the art, plural LBS platforms and application servers, as well as other monitoring and participating LBS stations in communication therewith are also contemplated. For instance, client positions may be gathered and stored on the LBS platform 104 for access by various parties in the system. Namely, such parties may include, but are not limited to, clients requiring knowledge of the position of other clients in the system, server stations monitoring the client positions and providing clients with position-dependent guidance and information, system administration and maintenance stations monitoring system usage and efficiency, and other such parties involved directly or indirectly with the service provider.

Still referring to FIG. 3, as a client 102 migrates from one area to another, the client's position is tracked both by the client 102 and by the application server 127. When using plural MCDs and GPS receivers, it is important that the client 102 be capable of ensuring proper transfer of GPS data to the application server 127. As discussed hereinabove, if the client 102 receives coverage from an A-GPS network, the GPS data needs not be transferred by the client 102 as the GPS data should already be available to the LBS platform 104 and application server 127 from the A-GPS server 124. On the other hand, if A-GPS coverage is not available or accessible, the client 102 will transfer the GPS data to the network 106 using one of its radio transceivers 108. Having plural MCDs will allow the client 102 to increase coverage probabilities and ensure optimal tracking and navigation, namely by gaining access to wireless communications using different wireless networks 106.

Figure 4:
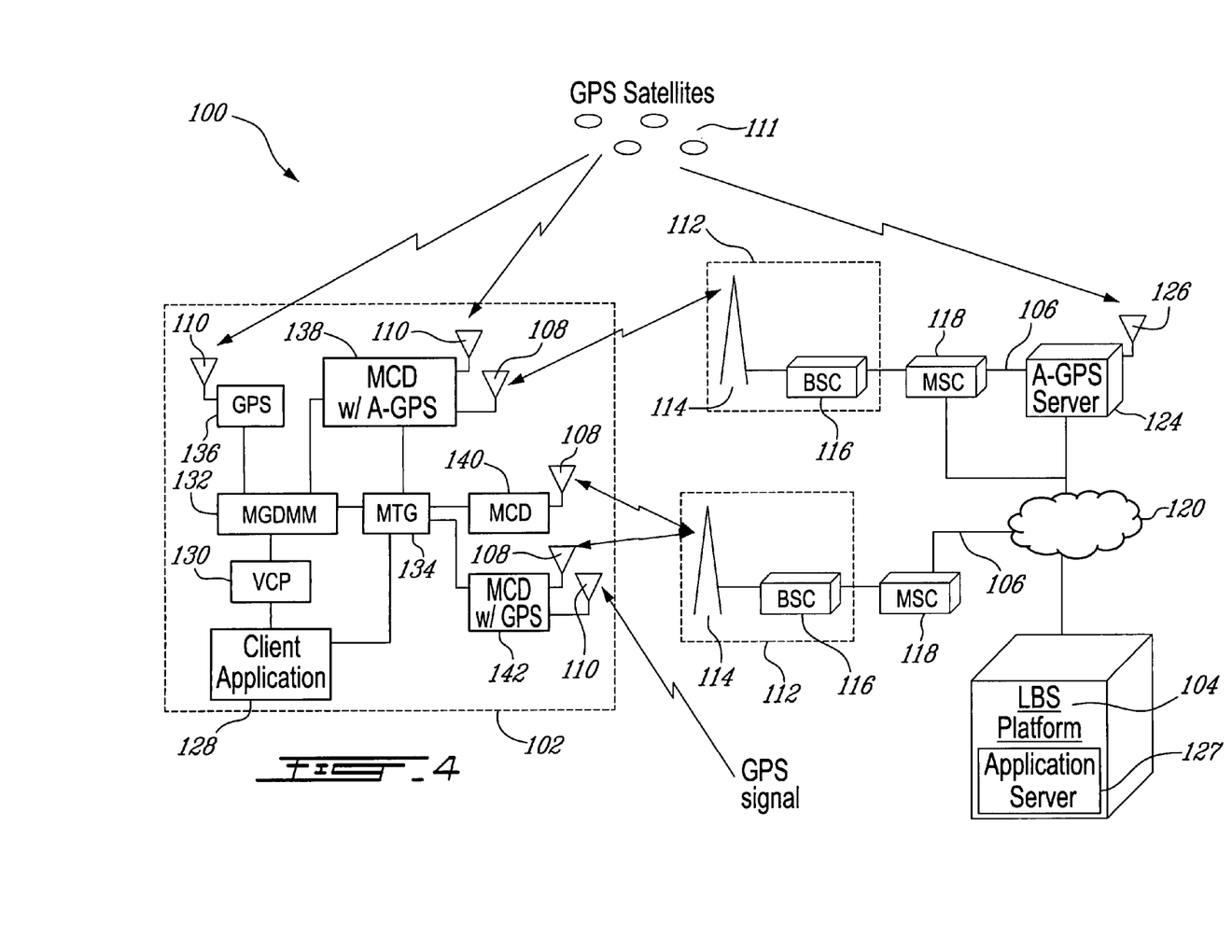
FIG. 4 shows, in diagrammatic form, GPS and communication modules of a client within an LBS system in accordance with an example embodiment of the invention.

Referring now to FIG. 4 in conjunction with FIG. 3, the client 102 generally comprises a client application 128, a virtual COM port (VCP) 130, a mobile GPS data management module (MGDMM) 132, a mobile TCP/IP gateway (MTG) 134, at least one GPS receiver, as in 110, and at least one radio transceiver, as in 108. As will be apparent to a person of ordinary skill in the art, the client 102 may either form a single device, or comprise plural devices and components linked together. The various links and connections will be further discussed hereinbelow with reference to FIG. 5.

Still referring to FIGS. 3 and 4, the illustrated client 102 is comprised of an independent GPS receiver 136, a MCD with an integrated A-GPS receiver 138, an independent MCD 140 and a MCD with an integrated GPS receiver 142. Generally, any suitable combination of A-GPS receivers, GPS receivers and MCDs is a contemplated alternative for the illustrated combination. For instance, any suitable MCD operating on a wireless communication network that is either coupled integrally or externally to a GPS or an A-GPS receiver is contemplated. For example, MCDs may include, but are not limited to, a vehicle radio modem (VRM), a Dataradio™, an IQModem™, a cell phone, a PDA, a laptop computer, or any other suitable device or combination thereof configured for wireless communication with a public or private network. GPS and A-GPS receivers may either be integrated within the above MCDs, or again operate as stand-alone devices with optional communication links to an external MCD.

Again still referring to FIGS. 3 and 4, and as discussed hereinabove, the wireless networks 106 generally comprise plural base stations, as in 112, a mobile switching center (MSC) as in 118, and optional A-GPS servers as in 124 each comprising a reference GPS receiver 126. Communications from a MCD is handled by these components for transfer through the core network 120 to a selected LBS platform 104 and application server 127.

The base stations 112, housed with at least one base transceiver station (BTS) 114 and a base station controller (BSC) 116, performs functions such as processing call requests from the MCDs and relaying information between the MCDs and the wireless network. In an A-GPS implemented network, the base station may also relay information between the A-GPS server 124 and the A-GPS implemented MCD, as in 138, as part of its standard communication protocol.

In general, the BTS 114 is a network endpoint equipment performing base band signal processing, wire/radio conversion, transmission and reception of wireless signals and, in the presence of an A-GPS server 124, A-GPS data communications with A-GPS devices 138. The BSC 116, which performs comprehensive control over the BTS 114, performs various functions such as radio channel allocation and release with respect to the MCD, transmission power control of the BTS 114, and other such operation and maintenance functions associated with the BTS 114.

The MSC 118 controls the base stations 112 to more effectively operate and communicate with the core network 120. In an A-GPS implemented network, GPS communications between the A-GPS server 124 and an A-GPS MCD as in 138 will be mediated by the MSC 118 for assisted position determination.

As stated hereinabove, the system 100 may operate using any suitable private or public wireless network. Such networks may include, but are not limited to AMPS (Advanced Mobile Phone System), CDPD (Cellular Digital Packet Data), 1xRTT (Single Carrier Radio Transmission Technology), CDMA (Code Division Multiple Access), CDMA2000 1x, 3x, EV-DO, EV-DV, GSM (Global System for Mobile Communication), GPRS (General Packet Radio Service), TDMA (Time Division Multiple Access), WCDMA (Wideband CDMA), and UMTS (Universal Mobile Telecommunication System) networks, as well as any other suitable private or public network structured for wireless communications between a MCD and an application server, as in 127.

As will be apparent to a person of ordinary skill in the art, the implementation of the above and other public and private wireless networks may take various forms. For instance, though the embodiments illustrated herein discuss network structures based on network communications between plural BTS, BSC and MSC for subsequent communication to the application server 127 through a core network 120, other network configurations will provide a similar result. Ultimately, though different network structures may use different combinations and configurations of base stations, switching centers, gateways, signal transfer points, servers, broadcast centers and the like, as well as different standard and proprietary protocols for communication therebetween, the conceptual system remains the same. An MCD communicates with a base station that will guide the communication through a given network, whether it be strictly wireless using various radio frequencies and frequency bands, or it be serviced by various private or public landline networks including cable networks, fibre optic networks and the like, for reception by a selected application server, and vice versa. As for A-GPS services, if A-GPS coverage is available and accessible to the MCD, GPS positioning data will be accessible to both the MCD and the application server through the standard communication protocols of the selected wireless network.

Figure 5:
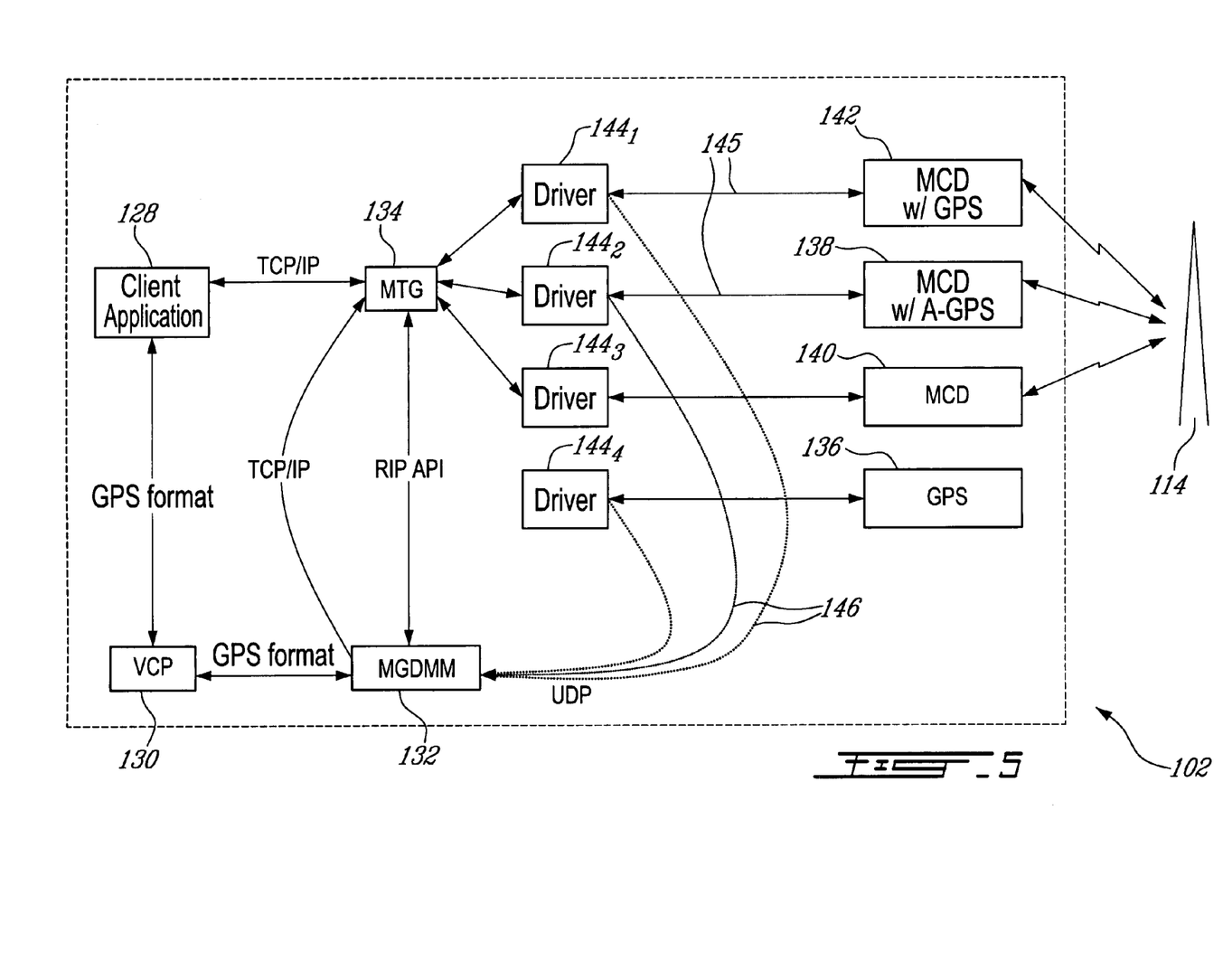
FIG. 5 shows, in diagrammatic form, data communications within the client of FIG. 4.

Referring now to FIGS. 4 and 5, and in accordance with an example embodiment of the invention, the client 102 and its internal and external communications within the system 100 will be described in further detail. As mentioned hereinabove, the client 102 will ensure that its calculated GPS position is consistently available to the application server 127. When A-GPS coverage is available and accessible to the client 102, the GPS position of the client 102 is automatically available both to the client 102 and to the LBS platform 104 through the standard communication protocols of the A-GPS network. In other words, communication between the A-GPS device 138 and the A-GPS server 124, through a base station 112 and a MSC 118 configured therefore, will provide access to calculated GPS positions both to the client 102 and to the LBS platform 104 as part of the A-GPS standard protocol. The client will obtain the calculated position through the assisted position determination protocol established with the A-GPS server 124, and the application server 127 will access the calculated position directly from the A-GPS server 124.

As discussed hereinabove, two different GPS positioning methods may be used simultaneously. Furthermore, to optimize client network coverage, the client may be equipped with more than one type of MCD. In the illustrated example embodiment, the client 102 is equipped with three (3) MCDs and an external GPS receiver 136. Each device communicates with a respective driver 144 using an appropriate communication link 145. For instance, if the MCD 142 is an external cell phone comprising a full GPS receiver, the driver could be a dial-up driver and communication between the two could be transferred over an RS-232 link connected to one of the client's communication ports (e.g. COM 1). Alternatively, an A-GPS 1xRTT MCD 138 could communicate with a 1xRTT driver over a Personal Computer Memory Card International Association (PCMCIA) TCP/IP link. Other MCDs, such as a vehicle radio modem (VRM), a Dataradio™, an IQModem™, a CDPD MCD, or any other suitable type of MCD could communicate with their respective driver using an appropriate connection.

In various known clients, a single MCD and GPS device are coupled directly to the client application. In the illustrated example embodiment however, GPS data communications in client 102 are managed by the MGDMM 132 in conjunction with the MTG 134. In general, the MGDMM 132 will coordinate the reception of GPS data from the various GPS receivers 110 for subsequent transfer to the client application 128. In addition, if GPS data is not provided by an A-GPS receiver, or if GPS data is provided by an A-GPS receiver that does not have radio coverage at that moment, the MGDMM 132 will communicate the acquired positions to the application server 104 using the MTG 134 and one of the MCDs under radio coverage.

Still referring to FIGS. 4 and 5, the drivers 144 provide the first link to the MCDs and GPS receivers 110. In general, each driver 144 provides access to GPS coordinates from its associated device. In other words, driver 144, provides access to GPS coordinates from the MCD w/GPS 142, driver $144_2$ provides access to GPS coordinates from the MCD w/A-GPS 138, and driver $144_4$ provides access to GPS coordinates from the independent GPS receiver 136. To do so, the drivers 144 will first initialize their respective GPS device and configure the communication therewith to access the GPS coordinates. As coordinates are gathered, the drivers 144 in the illustrated example embodiment broadcast the GPS coordinates to the MGDMM 132 on a specific UDP port. The coordinates may be broadcast under any suitable GPS format, which may include public or proprietary formats such as, but not limited to, NEMA, TAIP and Zodiac formats. Forwarded with the GPS coordinates, the driver broadcasts will also include, in at least some examples, GPS processing information providing, for instance, the GPS format used, the radio and/or GPS hardware ID, the current MCD coverage and the type of GPS coverage (GPS or A-GPS).

The MGDMM 132, which may comprise a stand-alone hardware module, a software module, or a combination thereof, is generally responsible for the management of the gathered GPS coordinates and for routing the GPS coordinates appropriately to the client application 128 and, if need be, the application server 127. Consequently, the MGDMM gathers all GPS coordinates from all drivers 144 and transmits the GPS coordinates to the client application 128. In general, the MGDMM 132 limits all GPS transmissions to the client application 128 to specific parameters, such as time period, distance, etc. These parameters are adapted in accordance with the GPS initialization provided by the client application 128.

In order to bridge communications between the MGDMM 132 and the client application 128, a virtual communication port (VCP) 130 is used in at least some examples. In general, a client application, such as a legacy AVL application for example, is configured to access GPS data directly from the GPS device. Furthermore, since it is typical for only one GPS device to be used in known LBS clients, legacy client applications are normally configured to address a single GPS data input. In some example embodiments, plural GPS sources can provide plural GPS inputs, which can ultimately confuse legacy client applications. Therefore, the illustrated VCP 130 interfaces with the client application 128 to emulate the GPS COM port common to legacy applications. Consequently, the plurality of GPS data inputs can converge through the MGDMM 132 and be made accessible to the client application 128, which may generally include any suitable (new or legacy) application, through the VCP 130. Furthermore, communications from the client application 128, which in a legacy application would have been directed to the single GPS device, are provided through the VCP 130 to the MGDMM 132 to interface with the plural GPS receivers.

Generally, the nature of the VCP 130 will depend on the actual implementation of the MGDMM 132. In some instances, namely if the MGDMM 132 is implemented by hardware or software in a peripheral device, a physical communication port may be used instead of the VCP 130. Alternatively, if the client application 128 is already configured to address plural GPS sources, plural VCPs may be required or preferred, or again the application and MGDMM 132 may be configured to communicate with one another directly. As will be apparent to a person of ordinary skill in the art, other GPS communication methods between the client application 128 and the MGDMM 132 may be employed based on the configuration and implementation of the client application 128 and the MGDMM 132.

Still referring to FIGS. 4 and 5, the MGDMM 132 also verifies if a GPS coordinate has been transmitted and made accessible to the application server 127 through A-GPS coverage. The MGDMM 132 evaluates the above using the radio coverage information provided by the drivers 144. If no GPS coordinates have been transmitted, the MGDMM 132 will transmit one of the coordinates over a wireless TCP/IP connection using the MTG 134. To do so, it should first verify using, for example, a routing information protocol application program interface (RIP API) if at least one of the MCDs (138, 140 or 142) is available for transmission. In other words, the MGDMM 132 will ask the MTG 134, in communication with the drivers 144, if any of the MCDs are under radio coverage and thus available to transmit the GPS coordinates to the application server 127. If radio coverage is available, GPS coordinates are sent to the MTG 134 using a TCP/IP link for subsequent transmission to the application server 127 using one of the available MCDs.

The MTG 134 is generally comprised of a mobile gateway for enhanced wireless communication between the client 102 and the server application 127. It may include, for example, software and/or hardware packages that format data outgoing from the client 102 for efficient transfer over the wireless network, and data incoming form the wireless network for efficient processing within the client 102. In general, the MTG 134 provides a RIP API to the MGDMM 132 and transfers GPS coordinates received therefrom over a wireless TCP/IP link to the application server 127 using any available MCD under coverage. The MTG 134 also bridges communications between the client application 128, illustratively communicating therewith over a TCP/IP connection, and the application server 127. In this latter process, since the MGDMM 132 takes charge of routing the GPS coordinates to the application server 127 when needed, the MTG 134 will monitor communications from the client application 128 and remove any GPS coordinates sent therefrom. By filtering these communications, the MTG 134 will reduce overlap of GPS data transmissions to the application server 127.

In the illustrated example embodiment, the MTG 134 is a TCP/IP gateway, such as, for example, the Radio IP Mobile TCP/IP Gateway™ provided by Radio IP of Montréal, Canada, that transfers client data over the wireless network using a customized TCP/IP optimized for wireless communications. In general, the Radio IP MTG solution provides a wireless TCP/IP with a reduced overhead (7 byte header instead of the standard 40 byte TCP/IP header), eliminates duplicate packets commonly generated by the standard TCP/IP, uses the radio network confirmation instead of the TCP/IP confirmation, and provides a compression algorithm for reduced transmission load. As will be discussed further hereinbelow with reference to FIG. 7, an MTG counterpart is used in the illustrated LBS platform 104 to enhance communications between the application server 127 and the client 102.

Ultimately, any suitable mobile gateway may be used to transfer the data over the wireless network. In general, although a TCP/IP gateway is used in the illustrated embodiments, other gateways and data transmission means may replace the illustrated MTG 134 as understood by one skilled in the art.

Furthermore, a person of ordinary skill in the art will appreciate that any suitable connection type may be considered to link any of the components and modules within the client 102. The links and communication protocols discussed herein with reference to FIG. 5 are presented only as an example embodiment of the invention, and may be replaced and modified with any other link and/or protocol suitable for such communications.

In addition, the client 102 may also comprise other software or hardware modules and peripherals (no seen) to complement or support the LBS. For instance, the client 102 may comprise a processor for data processing and display, data storage means such as ROM, RAM, CD and DVD writers and readers, and other such components. The client 102 may also comprise a peripheral mouse, touchpad or trackball for user inputs and for interfacing with the client application 128, or again comprise a portable printer or scanner for the transfer of text or map data to and from the application server 127. Depending on the type of LBS provided, the client 102 may also comprise a display screen such as an LCD screen for map views and text communications with the application server 127 and with other clients 102 within the system 100. Ultimately, the person of skill in the art will appreciate that a variety of additional and complementary components and devices may be incorporated into the client 102, or coupled thereto, to provide features and functions to a user of the client 102 that run parallel or in series with the above-described GPS management system.

Figure 6:
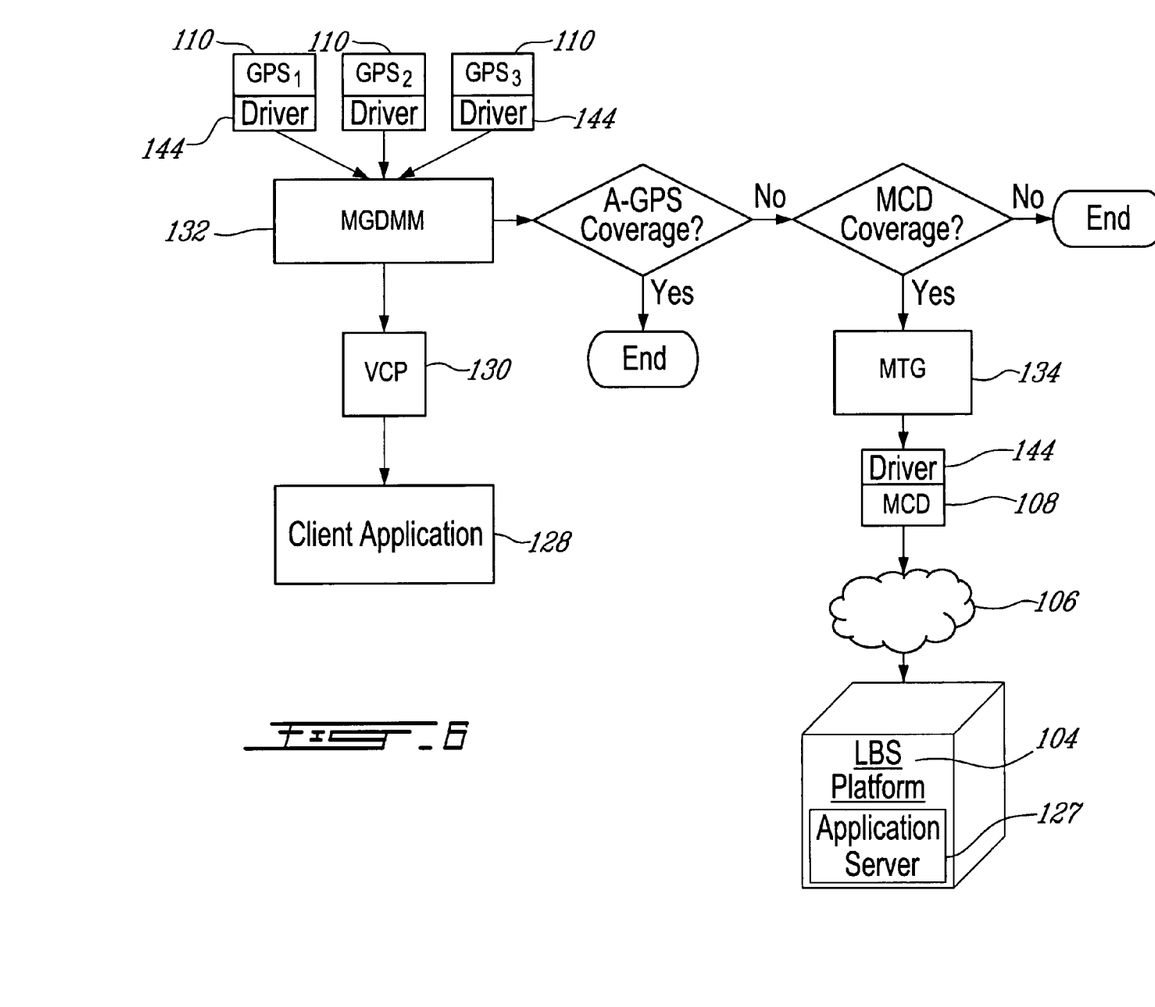
FIG. 6 shows, in flow chart form, GPS data transfers within a client in an LBS system in accordance with an example embodiment of the invention.

Adding reference now to FIG. 6, in conjunction with FIGS. 4 and 5, a conceptual flow chart illustrating the various transfers of GPS coordinates within the client 102 is presented. In general, GPS coordinates are first calculated and transferred to the MGDMM 132 by the drivers 144 over a specific UDP connection. In FIG. 6, three (3) GPS receivers are illustrated (at least one of which may be an A-GPS receiver) providing GPS coordinates to the MGDMM 132. In a first step, the MGDMM 132 transfers the acquired GPS coordinates through the VCP 130 to the client application 128 in accordance with a selected GPS format (e.g. TAIP, NEMA, Zodiac, etc). Secondly, the MGDMM 132 determines if A-GPS coverage is available. If it is, GPS coordinates are already accessible to the application server 127 and no GPS coordinates are sent thereto by the MGDMM 132. If there is no A-GPS coverage available at the moment, the MGDMM 132 verifies MCD coverage and availability with the MTG 134 using the RIP API. If no MCD coverage is available, GPS coordinates cannot be transferred to the application server 127 and the client 102 must wait for MCD coverage to be re-established. If MCD coverage is available, the MGDMM 132 of the illustrated example embodiment transfers GPS coordinates to the MTG 134 over a TCP/IP link, which then transfers the coordinates through the network 106 and to the application server 127 using one of the available MCDs 108.

Figure 7:
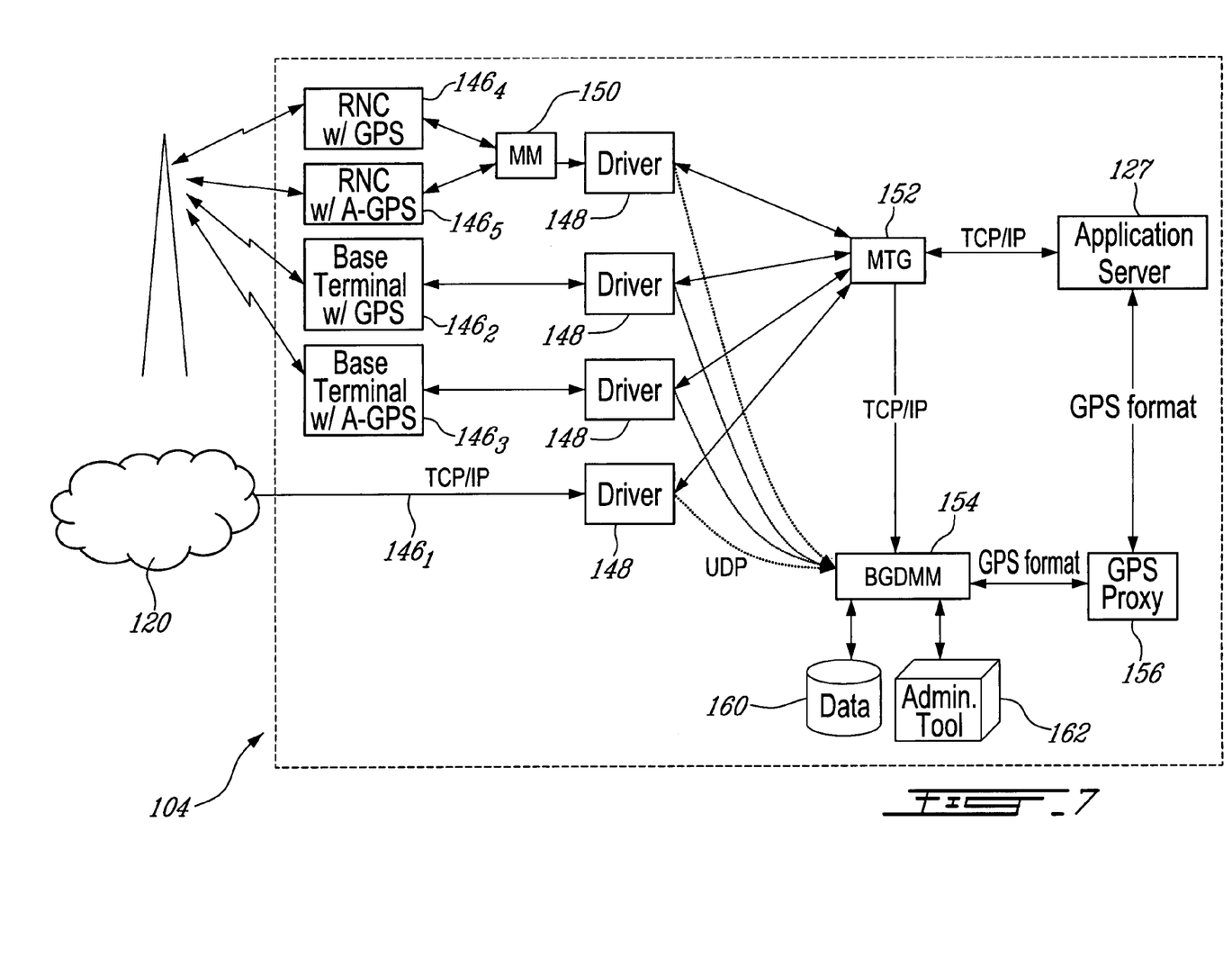
FIG. 7 shows, in diagrammatic form, data communications within an LBS platform in accordance with an example embodiment of the invention.

Referring now to FIG. 7 in conjunction with FIG. 4, and in accordance with an example embodiment of the invention, the LBS platform 104 will be described in further detail. The LBS platform 104 is generally comprised of at least one network access terminal 146 and respective drivers 148 therefore. In the illustrated embodiment, the network access terminals may include, but are not limited to, a TCP/IP connection 146, to a core network 120 in communication with at least one wireless network 106, a base terminal with optional GPS ($146_2$) or A-GPS ($146_3$) coverage and communicating directly or indirectly with a wireless network 106, or a radio network controller with optional GPS ($146_4$) or A-GPS ($146_5$) coverage linked to a respective driver 148 through a mobile manager (MM) 150. Other network access terminals 146 are contemplated.

In general, the LBS platform 104 should have network access terminals 146 capable of communicating with each MCD type implemented in the system 100. In other words, if a client 102 communicates with the network 106 using, for example, a Dataradio™ or an IQModem™, then the LBS platform 104 should respectively be equipped with a Dataradio™ or an IQController™. Similarly, communication incoming from, for example, a client's cell phone, VRM, CDPD MCD or 1xRTT MCD should be addressed by an LBS platform network connection configured for such communications. Whether data communications are done directly through the wireless network radio communications, or through an established network communicating therewith, the LBS platform 104 should be configured accordingly to communicate with the mobile clients 102 in the system 100.

In at least one example embodiment, the LBS platform 104 also comprises a mobile TCP/IP gateway (MTG) 152, a base GPS data management module (BGDMM) 154, a GPS proxy server 156 and an application server 127. The LBS platform 104 may also comprise data storage means 160 and administration tools 162 for customization and optimization of the LBS system 100.

The drivers 148 provide a first link to the network access terminals 146 and optional GPS receivers. If GPS receivers are implemented with the network access terminals 146, each driver will receive or get GPS coordinates from its associated device. To do so, the drivers 148 should first initialize their respective GPS device and configure the communication therewith to access the GPS coordinates. As coordinates are gathered, the drivers 148 broadcast the GPS coordinates to the BGDMM 154 on a specific UDP port. The coordinates may again be broadcast under any suitable GPS format, which may include public or proprietary formats such as, but not limited to, NEMA, TAIP and Zodiac formats. Forwarded with the GPS coordinates, the driver also broadcasts GPS processing information providing, for example, the GPS format used and the hardware ID of the active network access terminal 146.

In general, the optional GPS receivers integrated with the network access terminals may have different functions. In a first example, a GPS receiver may be coupled to a terminal 146 for GPS monitoring and positioning of the terminal itself.

For instance, GPS monitoring of a fixed station can be used to provide GPS processing or post-processing corrections to mobile positioning data. Furthermore, if the system 100 is implemented using mobile LBS platforms 104, GPS positioning of these platforms 104 could be of significant importance to manage and operate the system 100.

On the other hand, a GPS or A-GPS receiver may be coupled to a terminal 146 to provide a direct A-GPS service to the clients 102 in the system 100. For instance, instead of accessing client positions from an A-GPS server 124, the service provider may opt to establish and provide a direct A-GPS service to clients 102 in the system 100. The application server 127 would then have direct access to the client A-GPS positions from the access terminals 146. In this situation, an A-GPS server, such as A-GPS server 124 of FIG. 4, would not be necessary to provide an A-GPS service to the clients 102.

The BGDMM 154, which may comprise a stand-alone hardware module, a software module, or a combination thereof, is generally responsible for the management of all the gathered GPS coordinates. These coordinates include GPS coordinates obtained from the A-GPS server 124 by the radio terminals 146, GPS coordinates obtained from the GPS and/or A-GPS receivers coupled to the radio terminals 146, and GPS coordinates received directly from MGDMM 132 of clients 102 without A-GPS coverage. As the coordinates are gathered, the BGDMM 154 routes the GPS coordinates to the application server 127.

To gather all the GPS coordinates, the BGDMM 154 is, in some examples, comprised of two communication channels. In the illustrated example, a first channel consists of a UDP link with the drivers 148 and is used to gather all GPS coordinates acquired by the network access terminals 146, whether they be GPS coordinates of the fixed or mobile terminal 146, GPS coordinates of the clients 102 under direct A-GPS coverage, or GPS coordinates of the clients 102 obtained from an A-GPS server as in 124. A second channel consists of a TCP/IP link with the MTG 152 and is used to gather all GPS coordinates sent by the clients 102 using the MGDMM 132 and MTG 134.

In the illustrated example embodiment, the gathered GPS coordinates are transferred to the GPS proxy 156 for communication to the application sever 127. In general, the BMGDMM 154 limits all GPS transmissions to the GPS proxy 156 to specific parameters, such as time period, distance, etc. These parameters are adapted in accordance with the GPS initialization provided by the application server 127 through the GPS proxy 156.

The MTG 152, like the MTG 134 provided with the client 102, is again generally configured to enhance communication between the client 102 and the application server 127. As in the client 102, the MTG 152 may include, for example, software and/or hardware packages that format data outgoing from the application server 127 for efficient transfer over the wireless network 106, and data incoming form the wireless clients 102 for processing within the application server 127. The MGT 152 bridges communications between the application server 127, communicating therewith over a TCP/IP connection in the illustrated example embodiment, and the clients 102.

In general, the system 100 should implement an MTG 134 in the clients 102 that works cooperatively with the MTG 152 in the LBS platform 104. For example, if a proprietary TCP/IP gateway, such as the Radio IP Mobile TCP/IP Gateway™ provided by Radio IP® of Montreal, Canada is used within the clients 102, then the application server 104 should also communicate with the wireless network 106 using a corresponding MTG 152.

Again, any suitable mobile gateway pair may be used to transfer the data over the wireless network. In general, although a TCP/IP gateway is used in the illustrated embodiments, it is contemplated that other gateways and data transmission means may replace the illustrated MTG 134 in the client 102 and MTG 152 in the LBS platform 104. A person of ordinary skill in the art will understand that various wireless communication means and protocols may be used to communicate between the application server 127 and the clients 102, without changing the general nature of the disclosed system 100. A person of skill in the art will also appreciate that the implementation of the above gateways may also form an integral part of the client application 128 and application server 127 respectively, such that independent gateways as in 134 and 152 may not be necessary.

The illustrated GPS proxy server 156, which bridges communications between the application server 127 and the BGDMM 154, translates the coordinates received by the BGDMM 154 to the specific protocol of the application server 127. In general, the proxy server 156 interfaces with the application server 127 using a communication interface specific to the application server 127.

In addition, storage means 160 and administration tools 162 may be coupled to the BGDMM 154, or to any other suitable point in the LBS platform 104, for data storage and system management purposes as will be appreciated by one skilled in the art.

Also, a person of ordinary skill in the art will appreciate that any suitable connection type may be considered to link the various components of the LBS platform 104. The links and communication protocols discussed herein with reference to FIG. 7 are presented only as an example embodiment of the invention, and may be replaced and modified with any other link and/or protocol suitable for such communications.

As will be apparent to a person of skill in the art, other network components and add-ons may also be considered in this embodiment to complement the inner workings of the LBS platform 104. Namely, various application server terminals and processing stations may be coupled to the LBS platform 104 to facilitate the operation thereof. Furthermore, the inclusion of optional GPS receivers in the network access terminals 146, as well as elsewhere within the LBS platform 104, may be used to provide additional GPS positioning services, such as post-processing position corrections and A-GPS services to the clients 102 and the application server 127.

Such features could be increasingly useful in a mobile LBS platform 104. For instance, provisions for a mobile LBS platform 104 may be of use in various dispatch systems wherein a mobile base station is required or preferred to provide mobile services in different areas. Plural LBS platforms 104 may also be considered to provide local services, or again private A-GPS or DGPS services to its clients 102.

As discussed hereinabove, the LBS system 100, as described herein with reference to the appended Figures, may comprise any of various LBS systems using GPS to obtain client positioning information. Namely, the system 100 provides users the option to combine plural radio and GPS sources within a single client 102 for increased radio and GPS coverage. Using again the example of an automatic vehicle location (AVL) system, this feature reduces the chance that the service provider will lose contact with and/or lose track of its clients at any time. This feature becomes increasingly important when the loss of positioning information at the application server 127 may have serious consequences, namely in dispatch AVL systems for emergency assistance, or again in criminal tracking systems. Ultimately, the system 100 may be configured for use in practically any LBS system operating either under variable and possibly unpredictable radio and/or GPS coverage, making use of clients comprising plural main or backup MCDs and GPS devices, and/or cooperatively operating both GPS and A-GPS devices.

GLOSSARY OF ACRONYMS USED

AFLT Advanced Forward Link Trilateration
A-GPS Assisted GPS
AOA Angle of Arrival
AVL Automatic Vehicle Location
BGDMM Base GPS Data Management Module
BSC Base Station Controller
BTS Base Transceiver Station
DGPS Differential GPS
EFLT Enhanced Forward Link Trilateration
E-OTD Enhance Observed Time Difference
GIS Geographical Information System
GPS Global Positioning System
GSM Global System for Mobile Communications
GSM/GPRS Global System for Mobile Communications/General Packet Radio Service
LBS Location-Based Service
MCD Mobile Communication Device
MGDMM Mobile GPS Data Management Module
MSC Mobile Switching Center
TDMA Time Division Multiple Access
TDOA Time Difference of Arrival
TIA/EIA Telecommunications Industry Association/Electronic Industries Alliance
UMTS Universal Mobile Telecommunications System
WCDMA Wideband Code Division Multiple Access Certain adaptations and modifications of the described embodiments can be made. Therefore, the above-discussed embodiments are considered to be illustrative and not restrictive.

What is claimed is:

1. A Location-Based Service (LBS) system comprising:
a mobile communication system comprising:
a fixed part comprising a first coverage area and a second coverage area outside of said first area;
a mobile part comprising at least one mobile device, each of said at least one mobile device comprising a Global Positioning System (GPS) device for establishing a GPS position of said mobile device and a management module for determining when said mobile device is within said first coverage area or said second coverage area; and
a data communication link between said fixed part and said mobile part; and
an LBS server for maintaining a current position of said at least one mobile device;
wherein said current position of said at least one mobile device is available within said fixed part when said at least one mobile device is within said first coverage area and wherein said current position is unavailable within said fixed part when said at least one mobile device is within said second coverage area;
wherein when said mobile device is within said first coverage area, said current position of said at least one mobile device is received at said LBS server from said fixed part and wherein when said management module determines that said mobile device is within said second coverage area, said GPS position of said at least one mobile device is transmitted periodically to said LBS server from said mobile device via a TCP/IP data connection established between said mobile device and said LBS server using said data communication link.

2. The LBS system of claim 1, wherein said first coverage area comprises a first base station and further wherein when said mobile device is within said first coverage area, said GPS position is transmitted to said first base station using said communication link and wherein said current position is said GPS position.

3. The LBS system of claim 1, wherein said fixed part comprises a plurality of base stations and wherein said current position is determined by said fixed part using triangulation between said plurality of base stations.

4. The LBS system of claim 1, wherein said mobile device further comprises a mobile gateway and a plurality of drivers, each said drivers associated with said GPS device for providing a communications interface between said mobile gateway and said GPS device.

5. The LBS system of claim 1, wherein said fixed part further comprises an LBS platform and wherein said LBS server is within said platform, said LBS platform including a base GPS data management module (BGDMM) for management of said position current gathered from said at least one mobile device as well as from network access terminals within said LBS platform.

6. The LBS system of claim 1, wherein said at least one mobile device is located in a vehicle and further wherein said LBS server comprises an application for monitoring a movement of said vehicle.

7. The LBS system of claim 1, further comprising a strap for attaching said at least one mobile device to a convicted criminal and further wherein said LBS server comprises an application for monitoring a current location of said convicted criminal.

8. The mobile device of claim 1, wherein said TCP/IP data connection has been optimised for wireless communications.

9. The mobile device of claim 8, wherein said optimised for wireless communications comprises reduced header length, elimination of duplicate TCP/IP packets and data compression.

10. A method for providing a current position of a mobile device comprising a Global Positioning System (GPS) device to a Location-Based Service (LBS) server, the mobile device moving within a fixed network comprising a first coverage area where the current position is transmitted periodically from the mobile device to the fixed network as part of normal operation of a communication system between the mobile device and the fixed network such that the current position of the mobile device is available within the fixed network when the mobile device is within the first coverage area and a second coverage area outside of said first coverage area where the current position is not transmitted from the mobile device to the fixed network as part of normal operation of the communication system such that the current position is not available within the fixed network when the mobile device is within the second coverage area, the method comprising:
establishing the current position using the GPS device;
determining if the mobile device is within the first coverage area or the second coverage area;
if the current position is within the first coverage area, communicating the current position to the LBS server using a data connection established between the fixed network and the LBS server; and
if the current position is within the second coverage area, communicating the current position periodically to the LBS server directly using a TCP/IP data connection established between the mobile device and the LBS server using the communication system.

11. The method of claim 10, wherein said TCP/IP data connection is optimised for wireless communications.

12. The method of claim 11, wherein said optimised for wireless communications comprises reduced header length, elimination of duplicate TCP/IP packets and data compression.

13. A mobile device for use in a wireless communication system, the system including at least one server adapted for communication over a fixed network and for providing a Location-Based Service (LBS) wherein a current position of the mobile device is available within the fixed network when the mobile device is within a first coverage area and wherein the current position is unavailable within the fixed network when the mobile device is within a second coverage area, the device comprising:
  a Global Positioning System (GPS) receiver for establishing the current position of the mobile device;
  a transceiver for providing a communication link with the fixed network, and
  a management module for determining whether the mobile device is within one of the first coverage and the second coverage area,
  wherein if the management module determines that the mobile device is within the second coverage area, said device establishes a TCP/IP data connection with the server using said communication link and transmits said current position periodically to the server using said TCP/IP data connection.

14. The mobile device of claim 13, comprising a pair of transceivers for providing a pair of communication links with the fixed network wherein a first of said pair of communication links is available in a first coverage area and a second of said pair of communication links is available in a second coverage area not overlapping with said first coverage area, wherein when the mobile device is within said first coverage area the server has access to said current position within the fixed network and wherein when the mobile device is within said second coverage the server does not have access to said current position within the fixed network.

15. The mobile device of claim 14, wherein said current position is transmitted systematically to said fixed network as part of the normal operation of said first communication link.

16. A computer program product embodied on at least one non-transitory computer-readable medium within a mobile device, the mobile device in communication through a mobile communication system and a fixed network with a Location-Based Service (LBS) system, the device comprising a transceiver and a GPS receiver for establishing a position of the client, the computer program product comprising:
  computer code for obtaining the current position from the GPS device;
  computer code for determining if the current position is within one of a first coverage area where the current position is transmitted periodically from the mobile device to the fixed network and therefore is available within the fixed network as part of normal operation of the mobile communication system between the mobile device and the fixed network when the mobile device is within said first coverage area and a second coverage area outside of said first coverage area where the current position is not transmitted between the mobile device and the fixed network and therefore the current position is not available within the fixed network when the mobile device is within said second coverage area as part of normal operation of the mobile communication system; and
  computer code for establishing a TCP/IP data connection between the mobile device and the LBS server using the communication link and periodically communicating the current position to the LBS server via said TCP/IP data connection if the current position is not transmitted periodically to the fixed network as part of normal operation of the mobile communication system.

* * * * *